US008383268B2

(12) United States Patent
Inda

(10) Patent No.: US 8,383,268 B2
(45) Date of Patent: Feb. 26, 2013

(54) LITHIUM ION SECONDARY BATTERY AND A METHOD FOR MANUFACTURING THE SAME

(75) Inventor: Yasushi Inda, Sagamihara (JP)

(73) Assignee: Kabushiki Kaisha Ohara, Kanagawa-Ken (JP)

( * ) Notice: Subject to any disclaimer, the term of this patent is extended or adjusted under 35 U.S.C. 154(b) by 179 days.

(21) Appl. No.: 11/453,377

(22) Filed: Jun. 15, 2006

(65) Prior Publication Data
US 2006/0234130 A1 Oct. 19, 2006

Related U.S. Application Data

(62) Division of application No. 10/716,117, filed on Nov. 18, 2003, now abandoned.

(30) Foreign Application Priority Data

Nov. 29, 2002 (JP) ................................. 2002-348532

(51) Int. Cl.
H01M 10/04 (2006.01)
H01M 10/05 (2010.01)
H01M 10/0562 (2010.01)

(52) U.S. Cl. ........ 429/223; 429/188; 429/189; 429/304; 429/322; 29/623.5

(58) Field of Classification Search .................. 429/188, 429/303, 304, 319; 29/623.3, 623.5; 204/192.1, 204/192.12; 419/40
See application file for complete search history.

(56) References Cited

U.S. PATENT DOCUMENTS

| | | | | |
|---|---|---|---|---|
| 5,188,768 A | * | 2/1993 | Sotomura | 252/519.34 |
| 5,702,995 A | * | 12/1997 | Fu | 501/10 |
| 6,315,881 B1 | | 11/2001 | Fu | |
| 6,365,300 B1 | * | 4/2002 | Ota et al. | 429/304 |
| 6,991,662 B2 | * | 1/2006 | Visco et al. | 29/623.4 |
| 2002/0045094 A1 | * | 4/2002 | Yoshino et al. | 429/137 |
| 2004/0058237 A1 | * | 3/2004 | Higuchi et al. | 429/209 |

FOREIGN PATENT DOCUMENTS

| | | |
|---|---|---|
| CA | 2382118 A1 | 3/2001 |
| CN | 1372705 | 2/2002 |
| EP | 0 704 920 A1 | 4/1996 |
| EP | 1 049 188 A1 | 11/2000 |

(Continued)

OTHER PUBLICATIONS

Office Action Canadian Patent Office Office Dated Apr. 18, 2007.

(Continued)

Primary Examiner — Ula C. Ruddock
Assistant Examiner — Alix Echelmeyer
(74) Attorney, Agent, or Firm — Hedman & Costigan, P.C.; James V. Costigan

(57) ABSTRACT

A lithium ion secondary battery includes a positive electrode, a negative electrode and a thin film solid electrolyte including lithium ion conductive inorganic substance. The thin film solid electrolyte has thickness of 20 μm or below and is formed directly on an electrode material or materials for the positive electrode and/or the negative electrode. The thin film solid electrolyte has lithium ion conductivity of $10^{-5} Scm^{-1}$ or over and contains lithium ion conductive inorganic substance powder in an amount of 40 weight % or over in a polymer medium. The average particle diameter of the inorganic substance powder is 0.5 μm or below. According to a method for manufacturing the lithium ion secondary battery, the thin film solid electrolyte is formed by coating the lithium ion conductive inorganic substance directly on the electrode material or materials for the positive electrode and/or the negative electrode.

1 Claim, 1 Drawing Sheet

FOREIGN PATENT DOCUMENTS

| | | |
|---|---|---|
| GB | 2 326 269 A | 12/1998 |
| JP | 61-128468 | 6/1986 |
| JP | 02-087415 | 3/1990 |
| JP | 04-162306 | 6/1992 |
| JP | 04-231346 | 8/1992 |
| JP | 05-109429 | 4/1993 |
| JP | 08-195219 | 7/1996 |
| JP | 10-083838 | 3/1998 |
| JP | 10-97811 | 4/1998 |
| JP | 11-086899 | 3/1999 |
| JP | 11-157872 | 6/1999 |
| JP | 2000-123874 | 4/2000 |
| JP | 2000-164252 | 6/2000 |
| JP | 2000-340257 | 12/2000 |
| JP | 2001-015125 | 1/2001 |
| JP | 2001-015164 | 1/2001 |
| JP | 2001-283922 | 10/2001 |
| JP | 2001-297796 | 10/2001 |
| JP | 2002-109955 | 4/2002 |
| JP | 2002-329524 | 11/2002 |
| WO | WO01/17051 A1 | 3/2001 |
| WO | WO03/021706 * | 3/2003 |

OTHER PUBLICATIONS

Office Action Korean Patent Office Dated Oct. 3, 2005.
Office Action Taiwan Patent Office Dated Feb. 20, 2008.
Office Action Chinese Patent Office Dated Feb. 27, 2009.
Office Action Chinese Patent Office Dated Apr. 29, 2005.
Translation of Filing in Corresponding Japanese Application in Japan Patent Office Dated Apr. 7, 2006.
Office Action Japan Patent Office in 2002-348532 Dated Sep. 2, 2008.
Office Action Japan Patent Office in 2002-348532 Dated Jan. 27, 2009.
Canadian Office Action Dated Jan. 31, 2012.

* cited by examiner

US 8,383,268 B2

LITHIUM ION SECONDARY BATTERY AND A METHOD FOR MANUFACTURING THE SAME

This application is a divisional application of Ser. No. 10/716,117, filed Nov. 18, 2003 now abandoned which claims the priority of Japanese application Serial No. 2002-348532, filed Nov. 29, 2002.

BACKGROUND OF THE INVENTION

This invention relates to a lithium ion secondary battery employing a thin film solid electrolyte and a method for manufacturing the same.

In the past, a non-aqueous electrolytic solution was generally used as an electrolytic solution for a lithium ion secondary battery. A lithium ion secondary battery employing a polymer electrolyte made of polymer as disclosed by Japanese Patent Application Laid-open Publication No. 2000-067917 has recently attracted more attention of the industry than such electrolytic solution employing liquid.

The lithium ion secondary battery employing a polymer electrolyte holds a liquid electrolytic solution in the polymer electrolyte and, therefore, has the advantage that there is little possibility of leakage of the liquid, that there is little possibility of corrosion, that short-circuiting between electrodes caused by precipitation of lithium in the form of dendrite can be prevented and that assembly of the battery is easy because the structure of the battery is very simple.

Since lithium ion conductivity of such polymer electrolyte is lower than an electrolyte containing only an electrolytic solution, there has occurred a practice to reduce thickness of the polymer electrolyte. There, however, has arisen a problem in such polymer electrolyte whose thickness is reduced that, since its mechanical strength is reduced, the polymer electrolyte tends to be broken or give rise to a hole during production of the battery resulting in short-circuiting between the positive electrode and the negative electrode. The gel polymer electrolyte is reported to have thickness in the order of 30 μm to 80 μm.

For improving the mechanical strength, there is a proposal in Japanese Patent Application Laid-open Publication No. 2001-015164 for a compound electrolyte containing lithium ion conductive glass-ceramic powder. This proposal however has not realized a thin film electrolyte having thickness of 20 μm or below.

There are also many proposals, e.g., in Japanese Patent Application Laid-open Publication No. Hei 07-326373, for a solid electrolyte battery which does not employ an electrolytic solution at all. Since a lithium ion secondary battery employing a solid electrolyte does not require an organic electrolytic solution as in the prior art batteries, there is no risk of leakage of solution and combustion and, therefore, a highly safe battery can be provided. In the prior art battery employing an organic electrolytic solution, the positive electrode and the negative electrode contact each other by means of the organic electrolytic solution through the solid electrolyte and, therefore, resistance in moving of ions in the interface does not cause a serious problem. If, however, all of the positive electrode, negative electrode and electrolyte composing the battery are made of solid, contact in the interface between the positive electrode and the electrolyte and contact in the interface between the negative electrode and the electrolyte become contacts between solids which include point contacts in some parts of the interfaces and thereby produce a large interface resistance as compared with the prior art batteries employing the electrolytic solution. Hence, the solid electrolyte battery has a large impedance in the interfaces which tends to cause polarization and thereby restrict moving of lithium ion in the interfaces with the result that it is difficult to realize a battery having a large capacity and a large output by such solid electrolyte battery.

It is, therefore, an object of the present invention to provide a lithium ion secondary battery which has solved the above problems and has a thin electrolyte and thereby has small resistance notwithstanding that a solid electrolyte is employed and, therefore, has a high battery capacity and a high output and an excellent charging-discharging characteristic and thereby ensures a stabilized use over a long period of time.

SUMMARY OF THE INVENTION

As a result of detailed studies and experiments, the inventor of the present invention has found, which has led to the present invention, that an inorganic substance having a certain crystal has a high lithium ion conductivity and its lithium ion transport number is 1 and that, by employing this substance as a solid electrolyte in the form of a thin film in a lithium ion secondary battery, a battery of a high performance can be realized.

A lithium ion secondary battery according to the invention comprises a positive electrode, a negative electrode and a solid electrolyte, said solid electrolyte being made in the form of a thin film comprising a lithium ion conductive inorganic substance.

The thin film solid electrolyte should preferably comprise an inorganic substance of a high lithium ion conductivity and, more preferably, a lithium ion conductive crystal, glass or glass-ceramics. In the thin film solid electrolyte used in the lithium ion secondary battery of the invention, the thinner the thin film solid electrolyte, the shorter is moving distance of lithium ion and, therefore, the higher is the output of the battery. In the lithium ion secondary battery, therefore, the thin film solid electrolyte should preferably have thickness of 20 μm or below and, more preferably, 10 μm or below and, most preferably, 5 μm or below.

Mobility of lithium ion during charging and discharging in the lithium ion secondary battery of the present invention depends upon lithium ion conductivity and lithium ion transport number of the solid electrolyte. Accordingly, in the lithium ion secondary battery of the invention, the thin film solid electrolyte should preferably have lithium ion conductivity of $10^{-5} Scm^{-1}$ or over.

BRIEF DESCRIPTION OF THE DRAWINGS

In the accompanying drawings.

DESCRIPTION OF PREFERRED EMBODIMENT OF THE INVENTION

Figure 1:
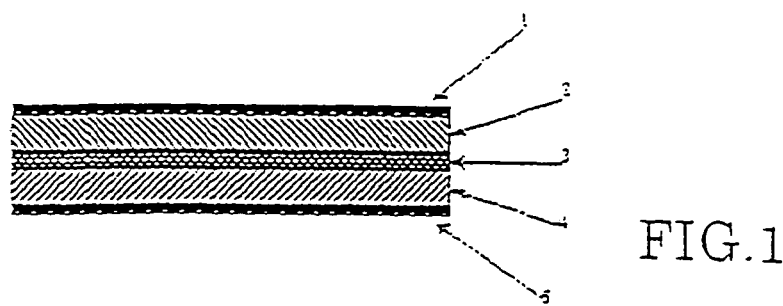
FIG. 1 is a schematic sectional view showing an internal structure of the lithium ion secondary battery of the present invention.

In a preferred embodiment of the invention, the thin film solid electrolyte should preferably comprise the inorganic substance in an amount of 40 weight % or over. The inorganic substance should preferably be an ion conductive crystal, glass or glass-ceramic. The inorganic substance should preferably be powder of the inorganic substance. The inorganic substance powder in the thin film solid electrolyte should preferably have an average particle diameter of 1.0 μm or below, more preferably 0.5 μm or below and, most preferably, 0.3,μm or below.

In the lithium ion secondary battery of the invention, the thin film solid electrolyte may comprise a lithium ion conductive inorganic substance powder in a polymer medium. The thin film solid electrolyte should preferably comprise a lithium inorganic salt and lithium ion conductive glass-ceramic powder.

In the lithium ion secondary battery of the invention, the thin film solid electrolyte may be formed by direct coating on an electrode material or materials for the positive electrode and/or the negative electrode.

The method for manufacturing a lithium ion secondary battery having a thin film solid electrolyte comprising a lithium ion conductive inorganic substance according to the invention comprises a step of forming the thin film solid electrolyte by coating the lithium ion conductive inorganic substance directly on an electrode material or materials for the positive and/or negative electrode.

As described above, the thinner the solid electrolyte, the less is resistance and the shorter is moving distance of ion and, therefore, the higher is the output of the battery. However, in a case where the solid electrolyte is produced independently and separately from the other components of the battery, there is limitation in making the solid electrolyte thin for reasons of strength and handling as well as the manufacturing process. According to the method for manufacturing a lithium ion secondary battery of the invention, the solid electrolyte is formed directly on an electrode material or materials for the positive electrode and/or the negative electrode and, therefore, there is no problem caused by handling an independent solid electrolyte and hence the solid electrolyte can be made even thinner.

The thin film solid electrolyte may be formed by preparing slurry comprising lithium ion conductive crystal, glass or glass-ceramic as the inorganic substance, and coating the slurry directly on the electrode material or materials for the positive and/or negative electrode.

For coating the slurry directly on the electrode material or materials for the positive electrode and/or the negative electrode, dipping, spin coating or tape casting may be employed or printing technique such as ink jetting or screen printing may be employed. As the slurry, lithium ion conductive powder of an inorganic substance may be dispersed with a binder in a medium. Preferable inorganic substances are a crystal, glass and glass-ceramic. The thin film solid electrolyte should preferably comprise an inorganic substance in an amount of 40 weight % or over.

The lithium ion conductive powder used in the present invention should preferably have a high lithium ion conductivity and, more preferably, a chemically stable glass-ceramic. A specific example of the powder of the chemically stable glass-ceramic is powder of glass-ceramic which is produced by heat-treating a $Li_2O—Al_2O_3—TiO_2—SiO_2—P_2O_5$ mother glass for crystallization and contains $Li_{1+x+y}Al_xTi_{2-x}Si_yP_{3-y}O_{12}$ ($0 \leq x \leq 1, 0 \leq y \leq 1$) as a predominant crystal phase.

For binding particles of crystal, glass or glass-ceramic powder to one another and also binding these particles to the electrodes which constitute substrates, an organic polymer material may be employed as the binder. Specifically, a polymer material such as polyethylene oxide, polyethylene, polypropyrene, polyolefin, fluorine resin such as polytetrafluoroethylene, polychlorotrifluoroethylene and polyvinylydene fluoride, polyamides, polyesters and polyacrylates, or a polymer material comprising such polymer as a constituent element may be used. A binder having lithium ion conductivity or a polymer imparted with lithium ion conductivity by adding lithium salt or the like material is more preferably because such binder improves ion conductivity of the compound electrolyte. As the medium, an organic medium in which the above described polymer material is dissolved or dispersed may be used.

In the lithium ion secondary battery of the invention, the thin film solid electrolyte may also be formed by coating a lithium ion conductive inorganic substance directly on an electrode material. For the direct coating known methods for making a thin film such as sputtering, laser abrasion and plasma spraying may be used. In this case, a lithium ion conductive crystal or glass or a compound material including such lithium ion conductive crystal or glass may be used as a target for forming a thin film directly on an electrode material.

As a target material, the above described chemically stable and highly lithium ion conductive glass-ceramic may preferably be employed. In making a thin film, this glass-ceramic sometimes becomes amorphous but, in this case, there will be no problem if the above described predominant crystal phase is caused to precipitate by crystallizing the amorphous glass by heat-treating. Similarly, the mother glass from which this glass-ceramic is obtained may be employed as the target. In this case also, the above described predominant crystal phase can be produced by the crystallizing process after the film has been formed. A target made of a compound material can be obtained by mixing an inorganic binder to powder of a lithium ion conductive crystal, glass or glass-ceramic and sintering the mixture. The glass-ceramic powder should preferably have lithium ion conductivity and, more preferably, should contain $Li_{1+x+y}Al_xTi_{2-x}Si_yP_{3-y}O_{12}$ as a predominant crystal phase. This glass-ceramic powder should preferably have an average particle diameter of 5 μm or below and, more preferably, 3μm or below. The inorganic binder used should preferably be a crystal or glass which is an inorganic oxide having a low melting point. The amount of this inorganic binder should preferably be 20 weight % or below.

In the lithium ion secondary battery using the thin film solid electrolyte of the invention, the positive electrode may be made by forming a material containing a transition metal oxide as a positive electrode active material on an aluminum foil used as a positive electrode collector. As the positive electrode active material, a transition metal compound capable of absorbing and storing and discharging lithium may be used. For example, an oxide or oxides containing at least one transition metal selected from manganese, cobalt, iron, nickel, vanadium, niobium, molybdenum, titanium etc. may be used. In a case where a material which does not contain lithium is used as a negative electrode active material, a transition metal oxide containing lithium may preferably be used.

In the lithium ion secondary battery using the thin film solid electrolyte of the invention, the lithium ion conductive inorganic substance may preferably be used not only for the thin film solid electrolyte but also in the positive electrode as an ion conductive additive. As the lithium ion conductive inorganic substance used for the positive electrode, glass-ceramic powder containing $Li_{1+x+y}Al_xTi_{2-x}Si_yP_{3-y}O_{12}$ as a predominant crystal phase as is used in the thin film solid electrolyte may preferably be used. This glass-ceramic powder should preferably have an average particle diameter of 5 μm or below and, more preferably, 3 μm or below.

In the lithium ion secondary battery using the thin film solid electrolyte of the invention, an electric conductive additive and/or a binder may preferably be used in the positive electrode. As the electric conductive additive, acetylene black may preferably be used and, as the binder, polyvinylidene fluoride PVdF may be preferably be used.

In the lithium ion secondary battery of the invention, the negative electrode may be made by forming a material containing a negative electrode active material on a copper foil used as a negative electrode collector. As the negative electrode active material, a metal or alloy capable of absorbing and storing and discharging lithium such as metal lithium, lithium-aluminum alloy and lithium-indium alloy, transition metal oxides such as titanium and vanadium, and carbon materials such as graphite, active carbon and mesophase pitch carbon fiber may be used.

In the lithium ion secondary battery of the invention, the lithium ion conductive inorganic substance may preferably be used not only for the thin film solid electrolyte but also in the negative electrode as an ion conductive additive. As the lithium ion conductive inorganic substance used for the negative electrode, glass-ceramic powder containing $Li_{1+x+y}Al_xTi_{2-x}Si_yP_{3-y}O_{12}$ as a predominant crystal phase as is used in the thin film solid electrolyte may preferably be used. The negative electrode may be produced by mixing a negative electrode active material with an ion conductive additive and a binder in acetone solvent and coating the mixture on the negative electrode collector. As the negative electrode active material, commercially available graphite powder may be used.

In the following description, the thin film solid electrolyte and the lithium ion secondary battery using it will be described with reference to specific examples and advantages of the lithium ion secondary battery having the thin film solid electrolyte of the invention will be described with reference to comparative examples. It should be noted that the present invention is not limited by the following examples but various modifications can be made within the scope and spirit of the invention.

EXAMPLES

Example 1

Preparation of the Positive Electrode

As the positive electrode active material, commercially available lithium cobalt oxide (LiCoO$_2$) was used. This positive electrode active material, acetylene black used as an electric conductive additive, glass-ceramic powder containing $Li_{1+x+y}Al_xTi_{2-x}Si_yP_{3-y}O_{12}$ as a predominant crystal phase used as an ion conductive additive and polyvinylidene fluoride PVdF used as a binder were mixed together in acetone solvent and this mixture was coated on a positive electrode collector made of an aluminum sheet having thickness of 10 μm to thickness of about 50μm and was dried under temperature of 100° C. to prepare a positive electrode in the form of a sheet. As the glass-ceramic powder, glass-ceramic powder having an average particle diameter of 1.0 μm (average in volume) and a maximum particle diameter of 8 μm was used. The particle diameter was measured using a laser diffraction/dispersion particle distribution measuring device.

Preparation of the Negative Electrode

As the negative electrode active material, commercially available graphite powder was used. This negative electrode active material, glass-ceramic powder used as an ion-conductive additive which was the same material used for the positive electrode, i.e., containing $Li_{1+x+y}Al_xTi_{2-x}Si_yP_{3-y}O_{12}$ as a predominant crystal phase and having an average particle diameter of 1.0 μm and a maximum particle diameter of 8 μm, and polyvinylidene fluoride PVdF used as a binder were mixed together in acetone solvent and this mixture was coated on a negative electrode collector made of a copper sheet having thickness of 10 μm up to thickness of about 50 μm and was used under temperature of 100° C. to prepare a negative electrode in the form or a sheet.

Preparation of the Thin Film Solid Electrolyte and Production of the Battery

Glass-ceramic powder containing $Li_{1+x+y}Al_xTi_{2-x}Si_yP_{3-y}O_{12}$ as a predominant crystal phase and having an average particle diameter of 0.15 μm and a maximum particle diameter of 0.3 μm and polyethyleneoxide added with LiBF$_4$ as a lithium salt were mixed uniformly in acetone solvent. This mixture was coated respectively on the active material side of the positive electrode and the active material side of the negative electrode and then acetone used as the solvent was dried and thereby removed whereby a thin film solid electrolyte layer was formed directly on the electrode materials for the positive and negative electrodes. The positive and negative electrodes were passed through a roll press with the coated sides of these electrodes being in contact with each other and was cut into a sheet having a size of 40 ×50 mm. Thus, a lithium ion secondary battery shown in FIG. 1 having a thin film solid electrolyte 3 formed between a positive electrode 2 and a negative electrode 4 was produced. The total thickness of this battery was 110 μm and the thickness of the thin film solid electrolyte in the battery was 3 μm.

Figure 2:
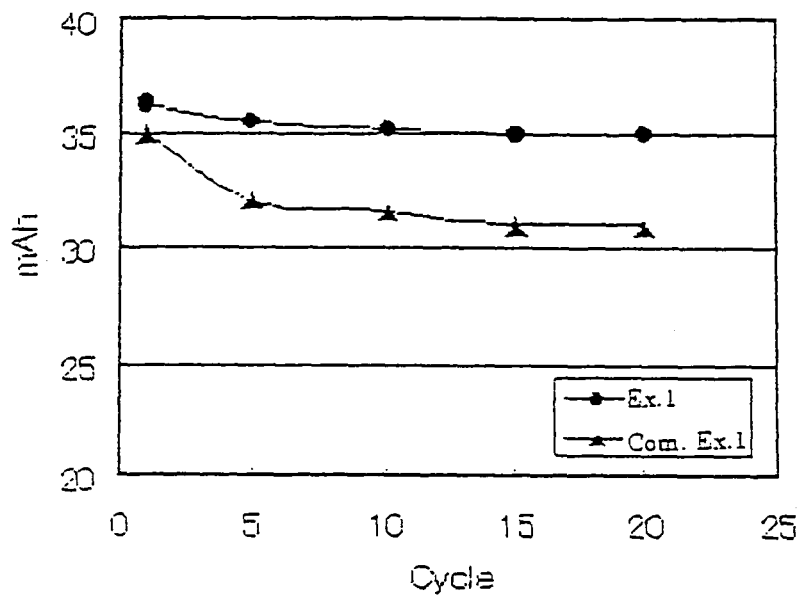
FIG. 2 is a graph showing change in the discharging capacity accompanying the charging-discharging cycles of the lithium ion secondary battery s of Example 1 and Comparative Example 1.

Lead wires were connected to a positive electrode collector 1 and a negative electrode collector 4 and the charging-discharging cycle test was conducted at 25° C. with charging finish voltage of 4.2 V and discharging finish voltage of 3.5 V. The cycle characteristic of the discharging capacity up to 20 cycles is shown in FIG. 2. Initial discharging capacity of Example 1 was 36.2 mAh and discharging capacity after 20 cycles was 34.1 mAh, thus maintaining more than 96% of the initial discharging capacity. Comparative Example 1

The same battery as the battery of Example 1 was produced except that glass-ceramic powder was not used but polyethyleneoxide added with LiBF$_4$ only was used for the thin film solid electrolyte. The charging-discharging cycle test was conducted under the same conditions as in Example 1. The cycle characteristic of the discharging capacity up to 20 cycles is shown in FIG. 2.

Example 2

Commercially available lithium cobalt oxide (LiCoO$_2$) was used as the positive electrode active material. This positive electrode active material and the same electric conductive additive, ion conductive additive and binder as used in Example 1 were mixed in acetone solvent. This mixture was coated on a positive electrode collector made of an aluminum sheet having thickness of 10 μm to thickness of about 50 μm to form a positive electrode layer. Immediately thereafter, the same mixture of glass-ceramic powder and polyethyleneoxide added with a lithium salt as used in preparation of the thin film solid electrolyte in Example 1 was coated thinly on the positive electrode layer to form an electrolyte layer. Then, the same mixture as used in preparation of the negative electrode in Example 1 was coated on the electrolyte layer to thickness of about 50 μm. A copper sheet which constituted the negative electrode collector was attached to the coated side of the negative electrode and, after drying under 100° C., the assembly was passed through a roll press and was cut into a sheet having a size of 40×50 mm. Thus, a lithium ion secondary battery shown in FIG. 1 having a thin film solid electrolyte 3 formed between a positive electrode 2 and a negative electrode 4 was produced. The total thickness of this battery was 100 μm and the thickness of the thin film solid electrolyte in the battery was about 2 μm. Since no drying process was inserted in the coating of the positive electrode, the electrolyte and the negative electrode, the positive electrode layer and the solid electrolyte layer existed in a mixed state in some portions of the interface between them and the solid electrolyte layer and the negative electrode existed in a mixed state in some portions of the interface between them.

Lead wires were connected to a positive electrode collector 1 and a negative electrode collector 4 and the charging-discharging cycle test was conducted at 25° C. and a constant current of 0.1 mA/cm$^2$ and with charging finish voltage of 4.2 V and discharging finish voltage of 3.5 V. The charging-discharging cycle test was also conducted at constant current of 1 mAh/cm$^2$.

Comparative Example 2

The same battery as the battery of Example 2 was produced except that glass-ceramic powder was not used for the thin film solid electrolyte. The charging-discharging cycle test was conducted under the same condition as in Example 2. Comparison between Example 2 and Comparative Example 2 of the initial discharging capacity of charging and discharging densities of 0.1 mA/cm$^2$ and 1 mA/cm$^2$ and the discharging capacity after 20 cycles are shown in Table 1.

TABLE 1

|  | Example 2 | | Comparative Example 2 | |
| --- | --- | --- | --- | --- |
|  | 0.1 mAcm$^2$ | 1 mAcm$^2$ | 0.1 mAcm$^2$ | 1 mAcm$^2$ |
| Initial discharging capacity (mAh) | 39.2 | 38.8 | 35.0 | 32.2 |
| Discharging capacity after 20 cycles (mAh) | 36.3 | 35.1 | 31.2 | 26.5 |

As will be understood from Table 1, in the battery of Example 2, deterioration of the discharging capacity with lapse of the cycle and deterioration of the discharging capacity due to rapid charging and discharging were both mitigated compared with Comparative Example 2.

Example 3

The same glass-ceramic powder containing $Li_{1+x+y}Al_x Ti_{2-x}Si_yP_{3-y}O_{12}$ as a predominant crystal phase and having an average particle diameter of 1.0 μm as used in preparation of the positive electrode in Example 1 was pressed and formed to a disk by using lithium phosphate $Li_3PO_4$ as the inorganic binder and thereafter the disk was sintered to provide a target material. A sputtering target having a diameter of 100 mm and thickness of 1 mm was obtained by grinding and polishing the outer periphery and both surfaces of the target material.

A thin film was formed on a lithium-aluminum alloy foil having a diameter of 20 mm and thickness of 20 μm by using an RF magnetron sputtering device. The solid electrolyte obtained had thickness of 0.1 μm. Then, a $LiCoO_2$ positive electrode film was formed on thin film solid electrolyte. The positive electrode film obtained had thickness of 2 μm. An aluminum film was formed as a positive electrode collector on this positive electrode film to thickness of 0.1 μm. Since the solid electrolyte and the positive electrode film became amorphous, heat treatment at 550° C. was applied and a thin film battery having thickness of about 22 μm was obtained. A disk having a diameter of 18 mm was stamped out from this battery and put in a coin battery having a diameter of 20 mm to assemble a coin type battery.

The charging discharging cycle test was conducted at −20° C., 25° C. and 80° C. and a constant current of 1 mAh/cm$^2$ and with charging finish voltage of 3.5 V and discharging finish voltage of 2.5 V. Also, the assembled coin type battery was mounted on a circuit substrate by reflow soldering at 250° C. and a similar cycle test was conducted at 25° C.

Comparative Example 3

An electrolyte was prepared by impregnating non-woven cloth with a conventional electrolytic solution and a battery was produced using this electrolyte. The same negative electrode made of lithium-aluminum alloy as in Example 1 was used and a positive electrode was prepared by forming a film of $LiCoO_2$ on an aluminum foil having thickness of 10 μm by a sputtering device in the same manner as in Example 1. The positive electrode and the negative electrode were attached to each other through a separator made of non-woven cloth having thickness of 26 μm and the separator was impregnated with propylene carbonate added with $LiN(C_2F_5SO_2)_2$ as a lithium salt whereby a thin film battery having thickness of about 58 μm was produced. In all other respects, the same process as in Example 3 was followed to produce a coin type battery. The charging-discharging test was conducted under the same conditions as in Example 3.

Comparison between Example 3 and Comparative Example 3 of initial discharging capacity discharging capacity after 300 cycles, initial discharging capacity and discharging capacity after 300 cycles after reflow soldering at different temperatures are shown in Table 2.

TABLE 2

|  | Example 3 | | Comparative Example 3 | |
| --- | --- | --- | --- | --- |
|  | Initial capacity (mAh) | Capacity after 300 cycles (mAh) | Initial capacity | Capacity after 300 cycles (mAh) |
| −20° C. | 0.12 | 0.11 | 0.05 | 0.02 |
| 25° C. | 0.22 | 0.20 | 0.22 | 0.16 |
| 80° C. | 0.24 | 0.19 | 0.22 | 0.12 |
| 25° C. (reflow soldering) | 0.21 | 0.18 | bursting | |

From Table 2, it will be understood that the battery of Example 3 had excellent cycle characteristic at the respective temperature and, even at −25° C., maintained about 50% of the capacity at the room temperature. The battery of Comparative Example 3 was burst by reflow soldering whereas the battery of Example 3 caused little change in the capacity by reflow soldering.

Example 4

Preparation of the Positive Electrode

A positive electrode layer and a think film electrolyte layer were formed on a positive electrode collector made of aluminum in the same manner as in Example 1 except that $LiMn_2O_4$ was used as the positive electrode active material.

Preparation of the Negative Electrode

As the negative electrode active material, $Li_4Ti_5O_{12}$ was used. This negative electrode active material, glass-ceramic powder used as an ion conductive additive and polyvinylidene fluoride PVdF used as a binder were mixed together in acetone solvent and this mixture was coated on a negative electrode collector made of a copper sheet having thickness of 10 µm to thickness of about 50 µm to prepare a negative electrode layer on the negative electrode collector. Immediately thereafter, the same mixture of glass-ceramic powder and polyethyleneoxide added with a lithium salt as used for preparation of the thin film solid electrolyte in Example 1 was coated thinly on the negative electrode layer to form a thin film electrolyte layer.

Production of the Battery

The positive electrode and the negative electrode were attached to each other on their electrolyte side and were passed through a roll press at 100° C. and dried. The positive electrode layer had thickness of 60µm, the thin film solid electrolyte layer had thickness of 3 µm, the negative electrode layer had thickness of 100 µm and the total thickness was about 180,µm. The assembly was cut into a sheet having a size of 40×50 mm and lead wires were connected to the positive electrode collector and the negative electrode collector. Charging-discharging cycle test was conducted at 25° C. at a constant current of 0.1 mA/cm² and with charging finish voltage of 3.0 0V and discharging finish voltage of 2.2 V.

Comparative Example 4

Figure 3:
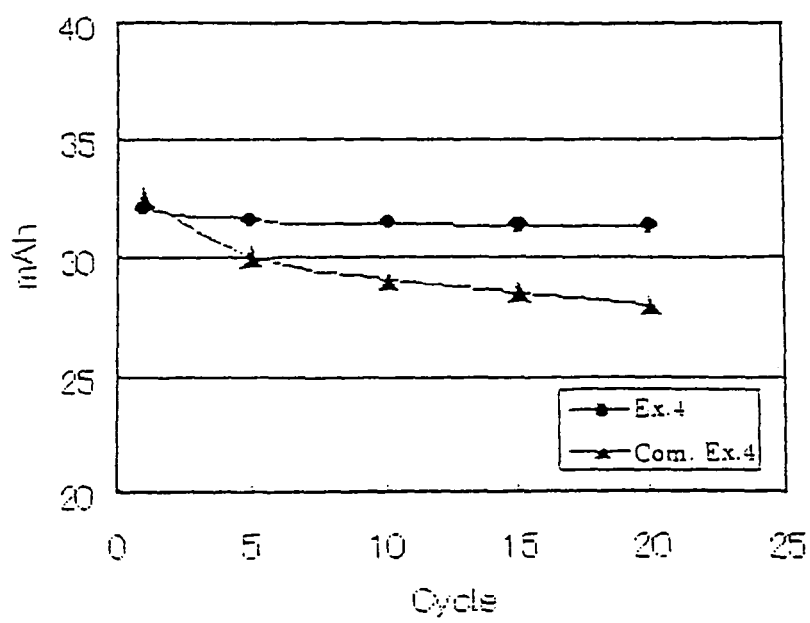
FIG. 3 is a graph showing change in the discharging capacity accompanying the charging-discharging cycles of the lithium ion secondary batteries of Example 4 and Comparative Example 4

The same battery as the battery of Example 4 was produced except that glass-ceramic powder was not used for the electrolyte layers of the positive and negative electrodes. The charging-discharging cycle test was conducted under the same conditions as in Example 4. The cycle characteristic of the discharging capacity up to 20 cycles is shown in FIG. 3. The initial discharging capacity of Example 4 was slightly lower than that of Comparative Example 4 but Example 4 exhibited little deterioration in the cycle characteristic and maintained 98% of the initial capacity after 20 cycles.

Example 5

The same battery as that of Example 4 was produced and the charging-discharging cycle test was conducted at 25° C. and at constant current of 0.1 mA/cm² and rapid charging-discharging of 1 and 3 mA/cm² with charging finish voltage of 3.0 V and discharging finish voltage of 2.2 V.

Comparative Example 5

Glass-ceramic powder and polyethyleneoxide added with LiBF₄ as a lithium salt was uniformly mixed in acetone solvent and this mixture was coated on a cast sheet to thickness of 50 µm, dried and passed through a roll press to produce a solid electrolyte in the form of a sheet having thickness of 30 µm. In the same manner as in Example 4, a positive electrode layer was formed on a positive electrode collector made of aluminum and a negative electrode layer was formed on a negative electrode collector made of a copper sheet. The positive electrode layer and the negative electrode layer were attached to both surfaces of the solid electrolyte (separator) in the form of a sheet and the assembly was passed through a roll press to produce a battery in the form of a sheet having thickness of 210 µm. The battery was cut into a sheet having a size of 40×50 mm and lead wires were connected to the positive electrode collector and the negative electrode collector. The charging-discharging cycle test was conducted under the same conditions as in Example 4. The initial discharging capacity and the discharging capacity after 20 cycles of Example 5 and Comparative Example 5 are shown in Table 3.

TABLE 3

| Charging/ discharging density | Example 5 | | Comparative Example 5 | |
|---|---|---|---|---|
| | Initial capacity (mAh) | Capacity after 20 cycles (mAh) | Initial capacity (mAh) | Capacity after 20 cycles (mAh) |
| 0.1 mA/cm² | 32.0 | 31.3 | 30.8 | 29.0 |
| 1 mA/cm² | 32.0 | 31.1 | 25.3 | 23.1 |
| 3 mA/cm² | 31.5 | 30.3 | 20.4 | 16.5 |

There was not much difference between the batteries of Example 5 and Comparative Example 5 at the charging-discharging rate of 0.1 mA/cm² but, as the charging-discharging density was raised to perform rapid charging-discharging, reduction in the capacity was clearly observed in Comparative Example 5. This reduction was caused by increase in resistance to moving of ion in the interface between the positive electrode and the solid electrolyte and the interface between the solid electrolyte and the negative electrode. In Example 5 in which the solid electrolyte was formed directly on the electrode, a battery capable of functioning adequately at a large output was obtained.

As described above, the lithium ion secondary battery having the thin film solid electrolyte of the present invention has a high output and excellent charging-discharging cycle characteristic. Further, since the battery of the invention does not contain an organic electrolytic solution a lithium ion secondary battery which is safer and more durable than the prior art batteries can be realized.

Further, in comparison with the prior art secondary battery having a solid electrolyte which has large electrochemical resistance in the interface between the positive electrode and the electrolyte or the interface between the electrolyte and the negative electrode, the lithium ion secondary battery having the thin film solid electrolyte of the present invention has realized excellent contact in the interface between the positive or negative electrode and the electrolyte by forming the solid electrolyte directly on the electrode whereby a battery having a high capacity and a large output can be provided.

In the prior art lithium ion secondary battery, there was a problem that, if the electrolyte is extremely thin, short-circuiting due to internal short-circuiting takes place when external stress is applied to the battery or the battery is bent. In the lithium ion secondary battery having the thin film solid electrolyte of the invention, a relatively large quantity of inorganic substance such as glass-ceramic powder is present in the solid electrolyte and, therefore, internal short-circuiting due to external stress does not take place. Besides, in a case where the thin film solid electrolyte is formed by sputtering, the entire solid electrolyte can be made of glass-ceramic and, in this case, possibility of short-circuiting can be totally eliminated.

What is claimed is:

1. A method for manufacturing a lithium ion secondary battery having a thin film solid electrolyte consisting of a lithium ion conductive inorganic substance selected from the group consisting of a lithium ion conductive crystal of $Li_{1+x+y}Al_xTi_{2-x}Si_yP_{3-y}O_{12}$ ($0 \leq x \leq 1, 0 \leq y \leq 1$) and a lithium ion conductive glass-ceramic comprising $Li_{1+x+y}Al_xTi_{2-x}Si_yP_{3-y}O_{12}$ ($0 \leq x \leq 1, 0 \leq y \leq 1$) as a predominant crystal phase, comprising a step of preparing a target material from glass-ceramic powder comprising $Li_{1+x+y}Al_xTi_{2-x}Si_yP_{3-y}O_{12}$ ($0 < x < 1, 0 < y < 1$) as a predominant crystal phase by using $Li_3PO_4$ as an inorganic binder, a step of coating the lithium ion conductive inorganic substance directly on an electrode material or materials for a positive and/or negative electrode to form an amorphous layer of 20 μm or below, by using the target material and by a method selected from the group consisting of sputtering, laser abrasion and plasma coating, and a step of forming the thin film solid electrolyte by crystallizing the amorphous layer.

* * * * *